United States Patent

Yamada

[11] Patent Number: 5,187,493
[45] Date of Patent: Feb. 16, 1993

[54] PEN EXCHANGING MECHANISM IN AUTOMATIC DRAFTER

[75] Inventor: Atsushi Yamada, Tokyo, Japan

[73] Assignee: Mutoh Industries Ltd., Tokyo, Japan

[21] Appl. No.: 831,990

[22] Filed: Feb. 6, 1992

[30] Foreign Application Priority Data

Feb. 6, 1991 [JP] Japan ............................. 3-10807[U]
Mar. 25, 1991 [JP] Japan ............................. 3-25225[U]

[51] Int. Cl.⁵ .............................. G01D 15/16
[52] U.S. Cl. ................... 346/49; 346/139 R
[58] Field of Search ............. 346/139 R, 140, 1.1, 346/141, 49, 29, 46; 400/18, 19, 20

[56] References Cited

U.S. PATENT DOCUMENTS 4,496,958  1/1985  Brandt et al. ............... 346/139 R
4,660,054  4/1987  Kajikawa et al. ........... 346/139 R Primary Examiner—Mark J. Reinhart
Attorney, Agent, or Firm—Sughrue, Mion, Zinn, Macpeak & Seas

[57] ABSTRACT

A drawing head 11 of a pens exchanging mechanism has a pair of stationary arms 12 and 13 attached at one edge of a drawing head and a pair of rotary arms 14 and 15 pivotably attached at opposite edge of the head. In order to hold stably and surely the writing instrument 10, a spring force of the lower rotary arm 15 deflecting toward the stationary arms 12 and 13 is designed to have a strong one. When the drawing head 11 comes near a stocker in order to carry out writing instruments exchanging operation between the stocker 19 and the drawing head 11, an extruding arm 18 on the lower rotary arm 15 hits a securing member 24 installed on the stocker 19. Further movement of the drawing head 11 rotates the rotary arm 15 and the rotary arm 15 goes away from the writing instrument 10. Then the upper rotary arm 14 engages with a rotary arm 21 of the stocker 19 and rotates going away from the writing instrument 10, thus a holding of the instrument 10 is transferred from the drawing head to the stocker.

3 Claims, 4 Drawing Sheets (A)

(B)

PEN EXCHANGING MECHANISM IN AUTOMATIC DRAFTER

BACKGROUND OF THE INVENTION

1. Industrial Field

The present invention relates to a pen exchanging mechanism of an automatic drafting machine.

2. Prior Art

According to the conventional mechanism for exchanging pens in an automatic drafting machine shown in FIG. 4, respective writing instrument holding means 2 of a stocker 1 consist of a stationary arm 3 and a rotary arm 4, and the writing instrument holding means 6 of the drawing head 5 consists of a pair of upper and lower stationary arms 7 and 8, and a rotary arm 9 situated at a mid position of the upper and the lower stationary arms. The rotary arms 4 and 9 are supported so as to turn around axes perpendicular to a face on which drawing operations are done, and urged to press a writing instrument 10 held by the stationary arms 3, 7 and 8 by means of springs (not shown).

A pen exchanging operation or the exchange of the writing instrument 10 between the writing instrument holding means 2 of the stocker 1 and the writing instrument holding means 6 of the drawing head 5 is automatically carried out through reciprocal motions of the drawing head 5 toward and leaving from the writing instrument holding means 6 along the direction of an arrow shown in FIG. 4. The principle of the conventional automatic pen exchanger has been known, for example, in detail from Japan Patent Application Laid-open No. 2-63080.

It is noted that the writing instrument holding function carried out at the writing instrument holding portion of the known drawing head is carried out through a three-point support technique of stationary arms and a rotary arm 39 (see FIG. 5). Accordingly, the writing instrument held at the drawing head 5 by the stationary arms and the rotary arm is unstable and not secured. It is necessary to increase the force of the spring installed for the rotary arm 39 in order to hold the writing instrument stably. However, when a strong spring is used for the rotary arm of the conventional automatic drafting machine of the flat bed type shown in FIG. 5, the rotary arm 39 of the drawing head 34 presses strongly against the writing instrument 38 and rubs it heavily when the drawing head 34 takes the writing instrument 38 held by the stationary arm 36 and the rotary arm 37, respectively, of the stocker 35, resulting in out of injuring the writing instrument 38. In addition, there is a fear of deforming the stationary arm 36 of the stocker 35 due to the strong pressure of the rotary arm 39 of the drawing head 34.

According to the conventional automatic drafting machine of the moving paper type in which writing instruments 43 are exchanged between a rotary type stocker 39 and a drawing head 40 as shown in FIG. 6 (A) and (B), before the rotary arm 42 of the drawing head 40 having a strong spring grips the writing instrument 43 placed on the stocker 39 in order to exchange writing instruments, the writing instrument 43 is strongly pressed by the movement force of the drawing head 40 as shown in particular in FIG. 6 6(B) resulting disadvantageously in an unintentional rotation or displacement of the stocker 39 from its stop position.

SUMMARY OF THE INVENTION

It is a general purpose of the present invention to provide a pen exchanging mechanism of an automatic drafting machine enabling reliable and stable holding of the writing instrument by means of a rotary arm of a drawing head, and making exchanging of the writing instruments between the drawing head and a stocker certain and effective.

It is another purpose of the present invention to provide a pen exchanging mechanism of an automatic drafting machine enabling prevention of damaged writing instruments, deformed stationary arms at the stocker, and displacement of the rotary position of a rotary stocker when writing instruments or pens are exchanged between the drawing head and the stocker, even when force of the spring of the rotary arm of the drawing head, which force is holding the writing instrument, is made strong.

According to the present invention, the writing instrument holding means of the drawing machine is constructed of a stationary arm and a rotary arm, and the writing instrument holding means of the drawing head is constructed of a stationary arm and two rotary arms. An arm is secured to one of two rotary arms of the drawing head and a stationary member of the drawing machine is stationed in a movement route of the protruding arm. During exchange of the writing instruments or pens between a stocker and the drawing head, the drawing head nears the writing instrument holding means, at a predetermined position, selected by the stocker, when the arm hits the stationary member. Then the rotary arm provided with the protruding arm opens outward due to a movement force of the drawing head resisting a strong urging force applied to the rotary arm.

When the drawing head moves and backs away from the stocker, the rotary arm closes along an inward urging direction. Another rotary arm of the drawing head and the corresponding arm of the stocker engage each other and disengage from the other when the drawing head moved reciprocally relative to the stocker as shown in FIG. 1 by an arrow. Consequently, it is noted that the writing instruments are automatically exchanged between the writing instrument holding means of the drawing head and another writing instrument holding means of the stocker.

It is understood that the rotary arm of the pen exchanging mechanism according to the present invention has the extruding arm and a strong writing instrument holding spring functioning to press inward the rotary arm, and the rotary arm is placed at a lower position than the other rotary arm separated from a face of the paper sheet. Due to the particular arrangement of both rotary arms, it is possible of the writing instrument holding means of the drawing head to stably hold the writing instrument receiving pressure or effect of the paper sheet when it is drawn.

DETAILED DESCRIPTION OF THE PREFERRED EMBODIMENTS

Constructions of the pen exchanging mechanism of the present invention will be explained with reference to the accompanying drawings.

Figure 1:
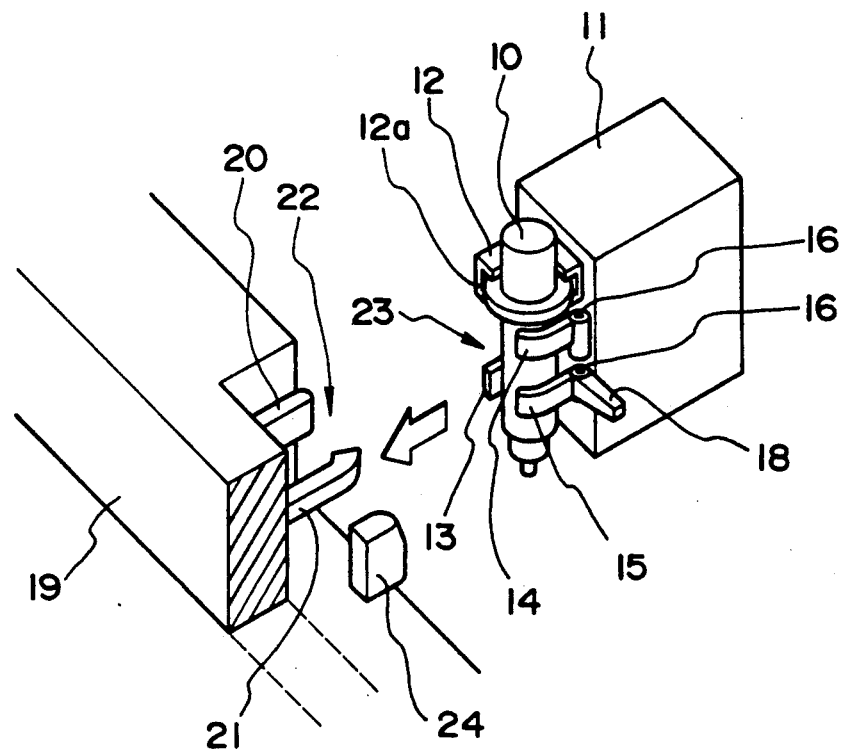
FIG. 1 is an explanatory perspective view of the automatic drafting machine according to a first embodiment of the present invention.

As shown in FIG. 1, the drawing head 11 of a flat bed type automatic drafting machine is secured so as to move along a Y rail (not shown).

The Y rail is supported on the drafting machine so as to move along the X axis direction in parallel with a mounting table (not shown) secured to the drafting machine.

The drawing head 11 is constructed so as to move to any position on the mounting table by a combination of movement of the drawing head 11 along a X axis direction of the Y rail, and a movement of the drawing head 11 in a Y axis direction along the Y rail of the drawing head 11.

The drawing head 11 contains an elevation drive mechanism consisting of a known moving coil and other necessary parts. A pair of stationary arms 12 and 13 are placed and secured at an upper position and a lower position of a side face of an elevator (not shown) connected to the elevation drive mechanism.

The upper stationary arm 12 has a groove 12a formed so as to slidably receive a part of a brim or flange of the writing instrument 10 and to restrict or prevent any vertical motion of the writing instrument 10.

On another side face of the elevator, there are two rotary arms 14 and 15. The former arm 14 as shown in FIG. 1 is placed at a midposition of the stationary arms 12 and 13, and the latter arm 15 is correspondingly placed with respect to the stationary arm 13. The rotary arms 14 and 15 are rotatably journalled by shafts 16 about an axis perpendicular to a face of the mounting table or a drawing face.

The rotary arms 14 and 15 are adapted to be biased toward the stationary arms 12 and 13 by means of respective springs 17. The spring force acting on the lower rotation arm 15 is stronger than that on the upper rotary arm 14. The spring force applied to the rotation arm 15 is determined so as to be sufficient to stably hold the writing instrument 10 without any displacement 10 held due to outside force.

One end of the arm 18 is secured to an end portion of the rotary arm 15, which portion is journalled on the shaft 16, and the arm 18 extends in a plane in parallel with the mounting table toward the outside of the rotary arm 15 at an angle of substantially a right angle relative to the rotary arm 15.

The writing instrument holding means 23 is constructed of the stationary arms 12 and 13, and the rotary arms 14 and 15.

The stocker 19 is placed at one side of the mounting table along the movement direction of the Y rail or the X axis direction and has a plurality of known writing instrument holding means 22 consisting of a stationary arm 20 and a rotary arm 21, each holding means being positioned on the stocker 19 at a regular interval.

Each writing instrument holding means 22 opens to the movement route of the Y rail. When the Y rail moves along the X axis direction, the writing instrument holding portion 23 of the drawing head 11 can move to a position facing the desired writing instrument holding portion 22 on the Y axis line.

The drawing head 11 moves or advances from its predetermined waiting position facing a selected writing instrument holding means 22 as shown in FIG. 1 along the Y axis to another functional position on the Y rail, at which functional position the writing instrument holding means 23 is inserted into an open space of the writing instrument holding means 22. Then, the drawing head 11 backs or retreats to its waiting position described above, so that a writing instrument 10 can automatically be exchanged between the writing holding portion 23 of the drawing head 11 and a writing instrument holding means 22 of the selected stocker 19.

A securing member 24 is secured to the stocker 19 for each writing instrument holding means 22, and is placed in the movement route of the arm 18 during the exchanging operation of the writing instruments.

Figure 2:
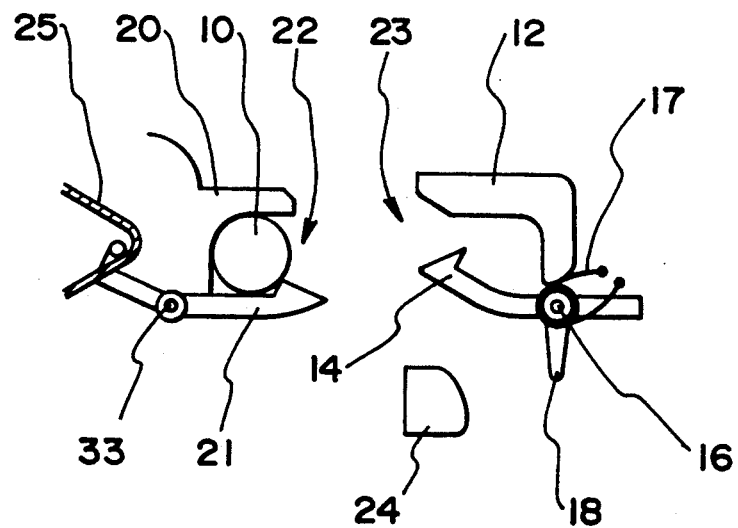
FIG. 2 is an explanatory plan view of the pen exchanging mechanism of the automatic drafting machine.

A base end of the rotary arm 21 is journalled on the stocker 19 so as to turn around an axis 33 perpendicular to the mounting table. The rotary arm 21 is urged by means of a spring 25 so as to bias a top end of the rotary arm 21 toward the stationary arm (FIG. 2).

When the drawing head 11 comes near the writing instrument holding portion 22 of the stocker 19, the stationary arms 12 and 13 of the drawing head 11 and the stationary arm 20 of the stocker 19 cross each other and do not collide with each other, because there is a difference in height between the positions of the stationary arm 20 and the pair of stationary arms 12 and 13.

Operation of the pen exchanging mechanism of the drafting machine according to the first embodiment of the present invention will now be explained.

The writing instrument 10 is held by a pair of stationary arms 12 and 13, and a pair of movable arms 14 and 15. The brim of the instrument 10 fits into the groove 12a formed in the stationary arm 12. Consequently, the writing instrument 10 is pressed at two locations of its peripheral surface by the two rotary arms 14 and 15, and at two opposite peripheral surfaces by the stationary arms 12 and 13.

That is, it is noted that the writing instrument 10 is held firmly through four supporting points; stationary arms 12 and 13; rotary arms 14 and 15, and additionally there is the strong urging force of the rotary arm 15. While the writing instrument holding means 23 of the drawing head 11 is kept holding the writing instrument 10, and as shown in FIG. 1, the writing instrument holding means 23 moves from the predetermined waiting position to a predetermined pen exchanging position toward the selected writing instrument holding portion 22 of the stocker 19 along the Y axis as shown by an arrow. The rotary arm 21 enters interiorly of the rotary arm 14, the rotary arm 14 is pressed to the outside against the force of the spring 17, the arm 18 hits the stationary member 24, and resultantly the rotary arm 15 is pressed to the outside against the force of a spring 17.

The outwards movement of the rotary arms 14 and 15 releases the writing instrument holding force of the stationary arms 12 and 13, and rotary arms 14 and 15, then the writing instrument 10 is held by the stationary arm 20 and the rotary arm 21 of the stocker 19.

Next, when the drawing head 11 retreats to the predetermined waiting position or moves along the direction opposite the arrow shown and is left from the stocker 19, the writing instrument 10 is left held by the writing instrument holding means 22 of the stocker 19 and the writing instrument holding means 23 of the drawing head 11 is left having no writing instrument 10.

When the drawing head 11 having no writing instrument 10 as shown in FIG. 2 moves to the writing instrument holding portion 22 of the stocker 19 having the writing instrument 10, the rotary arm 14 of the drawing head 11 moves to its pen exchanging position and enters interiorly of the rotary arm 21 of the writing instrument holding means 22 opposing the step mentioned above and presses the rotary arm 21 to the outside in order to release the writing instrument holding force of the stationary arm 20 and the rotary arm 21. Then, the writing instrument 10 in the writing instrument holding means 22 is held by the stationary arms 12 and 13, and the rotary arm 14. Retreating the drawing head 11 transfers the writing instrument 10 from the stocker 19 to the drawing head 11 and the writing instrument 10 is held there.

When the rotary arm 15 of the drawing head 11 comes near the stocker 19, the rotary arm 15 is urged to the outside at a position in front of the pen exchanging position by the stationary member 24, thus any collision of a front end of the rotary arm 15 and the writing instrument 10 held by the stocker 19 is avoided.

Figure 3:
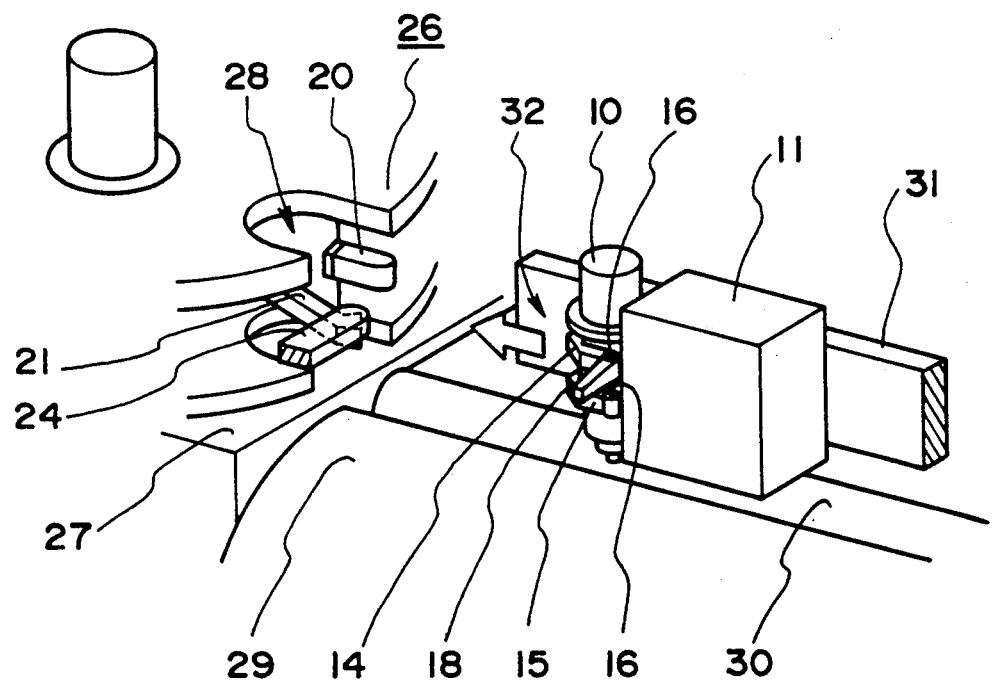
FIG. 3 is an explanatory perspective view of the automatic drafting machine according to a second embodiment.
Figure 4:
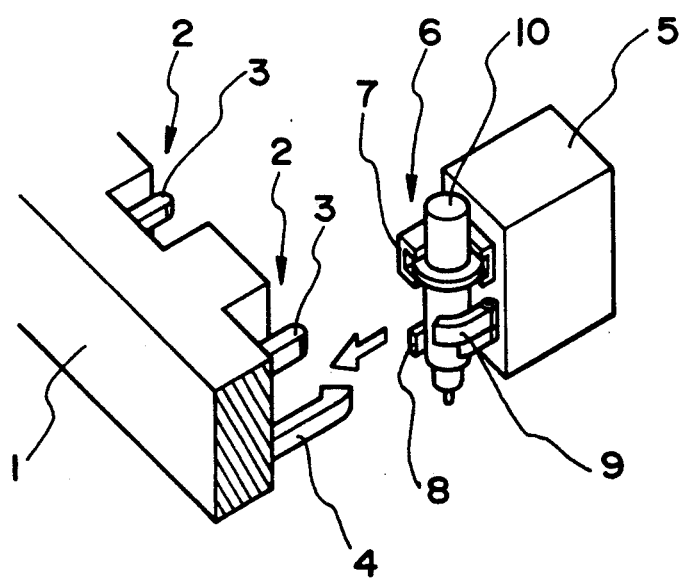
FIG. 4 is an explanatory perspective view of the conventional automatic drafting machine.
Figure 5:
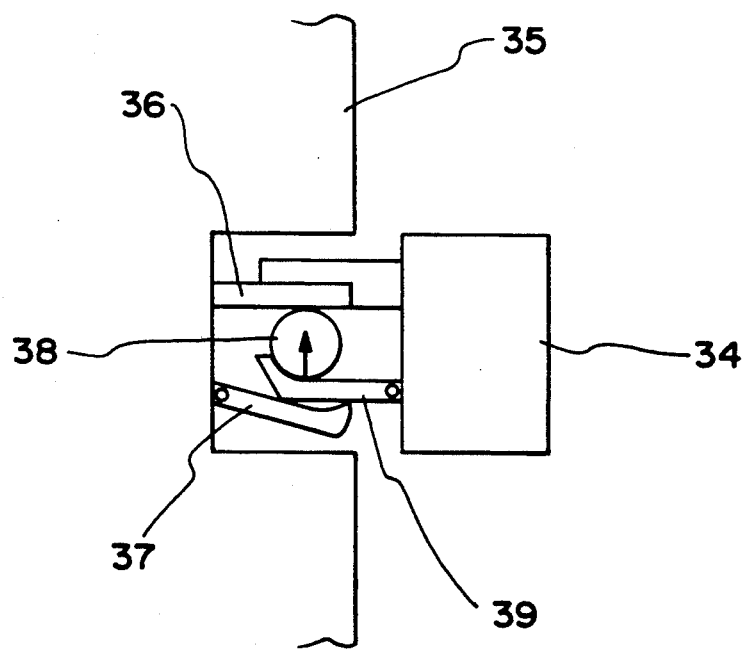
FIG. 5 is an explanatory plan view of the conventional pen exchanging mechanism.
Figure 6:
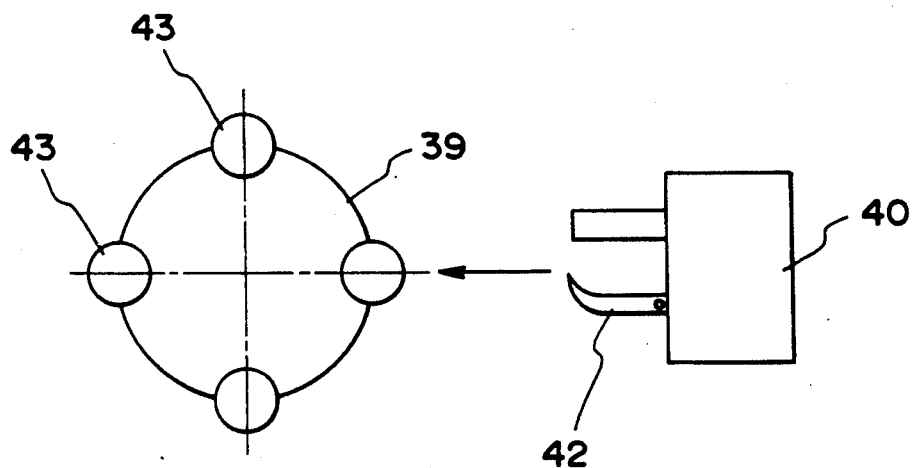
FIGS. 6A and 6B are another plan view of the conventional pen exchanging mechanism.
Figure 6:
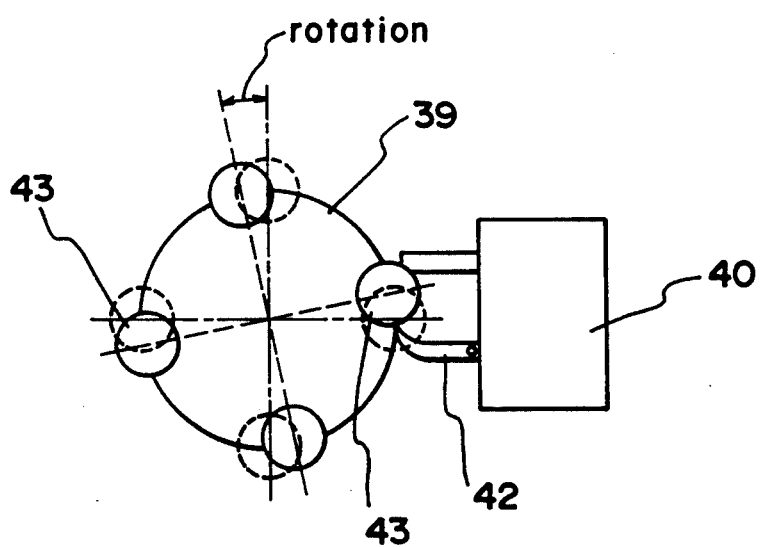

The pen exchanging mechanism according to the second embodiment of the present invention can be applied to a rotary type stocker 26 and the stocker 11 of a sheet driven type automatic drafter shown in FIG. 3.

It is apparent from FIG. 3 that the rotary type stocker 26 or a carrousel detachably connected to an output shaft of a motor installed on the drafting machine 27 has a plurality of writing instrument holding means 28 arranged around the circumference of the round carrousel 26 at a regular interval.

The writing instrument holding means 28 each consist of a stationary arm 20 and a rotary arm 21. The constructional principle of the writing instrument holding means 28 is substantially the same as that of the writing instrument holding means 22 shown in FIG. 1.

A drafting roller 30 is rotatably placed in a slit of a platen (sheet mounting plate). A Y rail (not shown) of the drawing machine 27 is placed above the drawing roller 30 and in parallel with the drawing roller 30.

The Y rail has the drawing head 11 movably installed thereon.

The drawing head 11 is connected to a steel belt 31 engaged with a Y motor. A paper sheet placed on the platen 29 is sandwiched between a press roller and a drive roller connected to a X motor, are reversible or reciprocating rotation of the drive roller moves the paper sheet on the platen in a direction perpendicular or at a right angle (X axis) to the longitudinal direction of the longitudinal one of the Y rail or drawing roller 30.

The construction of the writing instrument holding means 32 of the drawing head 11 is substantially identical with that of the writing instrument holding means 23 shown in FIG. 1. According to the first embodiment shown in FIG. 1, the protruding arm 18 is attached to the lower rotary arm 15. On the contrary, the arm 18 is attached to the upper rotary arm 14 according to the second embodiment shown in FIG. 3.

Consequently, the securing member 24 is secured to a position on the drafting machine 27 so as to oppose the arm 18 of the second embodiment.

A predetermined or desired pattern is drawn on the paper sheet according to motion in the Y axis direction along the Y rail of the drawing head 11, motion in the X axis direction of the paper sheet along the platen 29, and the elevating and lowering motion of the elevator body of the drawing head 11. During a drawing operation, a pen tip of the writing instrument 10 held by the drawing head 11 comes into contact with and withdraws from the sheet on the drawing roller 30, and additionally the writing instrument 10 moves along in an XY plane relative to the sheet paper.

The stationary member 24 is adapted to collide with the arm 18 of the drawing head 11, in an exchanging operation of the writing instruments 10 between the drawing head 11 and the stocker 26, when the drawing head 11 comes near the writing instrument holding portion 28 of the stocker 26.

Because the stocker 26 of the sheet drive type automatic drafting machine is of a rotary type it is not necessary to install a stationary member 24 at each writing instrument holding means 28 of the stocker 26. It is sufficient to install one stationary member 24 on a stationary element of the drawing machine.

According to the second embodiment of the present invention, an open side of the desired writing instrument holding portion 28 is made to face the writing instrument holding means 32 of the drawing head 11 in the Y axis direction. When the drawing head 11 approaches and then withdraws from the writing instrument holding means 28 of the selected stocker 26, it is possible as mentioned above to surely exchange writing instruments 10 or pens of the drafter between the writing instrument holding means 32 of the drawing head 11 and another writing instrument holding means 28 of the stocker 26.

The writing instrument exchanging operation in the second embodiment is identical with that of the flat bed type automatic drafting machine of the first embodiment.

According to the sheet drive type automatic drafting machine of the second embodiment, only rotary arm 21 and a rotary arm 15 corresponding to the former arm 21 relatively operate. Consequently, it is advantageous to make load of motor (not shown) for holding the stable rotary type stocker 26 small.

The present invention, the writing instrument holding system at the drawing head 11 is not restricted to a four-arm holding one, it is possible to employ a three-arm holding system using one stationary arm and a pair of rotary arms, respective rotary arms being placed opposedly at upper and lower positions.

What is claimed is:

1. A pen exchanging mechanism for a drafting machine, comprising:
   a stocker for holding a plurality of pens at a plurality of pen holding locations;
   a drawing head for holding a pen currently in use; and
   a pen exchange apparatus for delivering a pen from said stocker to said head or from said head to said stocker;
   said pen exchange apparatus comprising:
     at each of said pen holding locations of said stocker, at least one stationary arm member and at least one rotary arm member, for holding one of said pens;
     at said drawing head, at least a pair of stationary arm members, and a pair of rotatable arm members, and a biasing element for each of said rotary arm members, a first one of said rotary arm members including a lever arm joined to said first rotary arm member at a location proximate a pivot point thereof, and said stocker including at least one engaging element for contacting said lever arm and rotating said first rotary arm member against the base of its biasing element as said drawing head approaches said stocker.

2. The pen exchanging mechanism according to claim 1, wherein a spring force of the biasing element of said first rotary arm of said drawing head is stronger than that of the other rotary arm at said drawing head.

3. The pen exchanging mechanism according to claim 1, wherein said first rotary arm is arranged at a height from a drawing surface which is less than that of the other rotary arm at said drawing head.

* * * * *